United States Patent [19] [11] 3,948,342
Pircher et al. [45] Apr. 6, 1976

[54] AUTOMATIC RAILLESS GROUND CONVEYOR INSTALLATION

[75] Inventors: Herbert Pircher, Planegg; Johannes Hambuch, Geiselbullach, both of Germany

[73] Assignee: Buro Patent AG, Glarus, Switzerland

[22] Filed: June 21, 1974

[21] Appl. No.: 481,897

[30] Foreign Application Priority Data

June 26, 1973 Switzerland............... 9251/73

[52] U.S. Cl. .................................. 180/98
[51] Int. Cl.² ........................... B60K 26/00
[58] Field of Search ..... 180/98; 318/587; 246/63 A; 104/88

[56] References Cited
UNITED STATES PATENTS

| | | | |
|---|---|---|---|
| 2,847,080 | 8/1958 | Zworykin | 180/98 |
| 2,996,137 | 8/1961 | Chu | 180/98 |
| 3,147,817 | 9/1964 | DeLiban | 180/98 |
| 3,245,493 | 4/1966 | Barrett | 180/98 |
| 3,411,603 | 11/1968 | Kohls | 180/98 |
| 3,507,349 | 4/1970 | Comer | 180/98 |
| 3,512,601 | 5/1970 | Wilson | 180/98 |
| 3,610,363 | 10/1971 | Hartley | 180/98 |
| 3,628,624 | 12/1971 | Wesener | 180/98 |
| 3,642,087 | 2/1972 | Sampey | 180/98 |
| 3,768,586 | 10/1973 | Thompson | 180/98 |

*Primary Examiner*—Robert R. Song
*Assistant Examiner*—Terrance L. Siemens
*Attorney, Agent, or Firm*—Werner W. Kleeman

[57] ABSTRACT

An automatic railless ground conveyor installation incorporating a passive guide track determining the route network and individual driverless or unmanned traveling conveyor cars, each of which possesses a steering mechanism which scans in a contactless manner the guide track and a work control mechanism. The work control mechanism, by means of a code reader, scans in a contactless manner individual code markings arranged at junctions or branches and directly influences the steering mechanism in the sense of reaching a target or destination determined by a target code set at the work control mechanism. In front of each branch or junction a partial section of the guide track or a corresponding interruption thereof serves as continuous branch code track, the length of which indicates the code of the branch. The work control mechanism possesses a length measuring device which measures the length of the branch code track as well as a comparator which is operatively coupled with the steering mechanism and compares the measured branch code track length with a target code of a target code mechanism and which target code has been introduced as a length.

15 Claims, 10 Drawing Figures

AUTOMATIC RAILLESS GROUND CONVEYOR INSTALLATION

BACKGROUND OF THE INVENTION

The present invention relates to a new and improved construction of automatic railless ground conveyor installation of the type comprising a passive guide track which defines the route or stretch network and individual driverless or unmanned traveling conveyor cars, each of which are equipped with a steering mechanism which scans in a contactless manner the guide track as well as a work control mechanism which, by means of a code reader, scans in a contactless manner individual code markings or markers arranged at branches and influences the steering mechanism in the sense of reaching a target or destination determined by a target code set at the work control mechanism.

Such type automatic trackless ground conveyor installation has been disclosed, for instance, in German patent publication 1,481,482, corresponding to U.S. Pat. No. 3,474,877. The conveyor cars of such ground conveyor installation contain as the code reading mechanism or reader at least one of a number of reading elements responsive to the marking locations, and wherein in each case the reading element corresponding to a target or destination code can be switched so as to be in a preparatory receiving state and upon acting upon a branch by means of the code markings directly determine through the agency of the work control mechanism the travel directions of the branch. However, with such prior art ground conveyor installations it has been found to be disadvantageous that the code reader mechanism, which is independent of the steering mechanism which scans in a contactless manner the guide track, is relatively complicated and expensive. Furthermore, there are present certain difficulties in properly guiding the code reader mechanism over the code markings along the conveying path such that there is realized a faultless scanning operation.

SUMMARY OF THE INVENTION

Hence it is a primary object of the present invention to provide an improved construction of automatic railless ground conveyor installation which is not associated with the aforementioned drawbacks and limitations of the prior art proposals.

Another and more specific object of the present invention aims at the provision of an improved construction of automatic railless ground conveyor installation of the previously mentioned type which is simpler in construction and design and possesses increased operational reliability.

Now in order to implement these and still further objects of the invention, which will become more readily apparent as the description proceeds, the automatic railless ground conveyor installation of this development is manifested by the features that in front of each branch or junction a partial section of the guide track or an appropriate interruption thereof serves as the continuous branch code track, the length of which provides the code of the branch. Further, the work control mechanism possesses a length measuring device which measures the length of the branch code track as well as a comparator which compares the measured branch code track length with a target code of a target code mechanism and which target code is introduced as a length, the comparator being operatively coupled with the steering mechanism.

Since the guide track itself is employed for determining the branch code additional code markings or markers are no longer required. Consequently, the devices along the route or stretch are simpler and there is not required at the conveying or conveyor cars themselves any complicated reading mechanism. It is possible to provide an additional reading element for scanning the guide track for the reading mechanism; it is particularly advantageous if the scanning or scanner head of the steering mechanism which is present anyway for scanning the guide track is simultaneously used as the reader mechanism for the work control mechanism. There thus are rendered unnecessary additional reading elements. At the same time there is also realized a particularly positive scanning operation, since the conveying cars are always maintained over the guide track by means of the steering mechanism and its scanning head. Additionally, since it is no longer necessary that a number of code elements must be scanned by a number of reading elements, as such was the case for the above-mentioned state-of-the-art ground conveyor installation, the single reading element which is required for the invention of this development can be designed to have a greater detection range without being affected by other code elements. The novel ground conveyor installation of the invention manifests itself through its extremely great simplicity and high operational reliability.

The signal of the target code mechanism which is transmitted at a branch can be used for any type of steering mechanism for evaluation. It is however particularly advantageous if the target code mechanism is coupled with the steering mechanism in such a way that there is blocked for the length of the branch code track a steering or turning movement of the steering mechanism in the direction of the branches of the junction or branch, and wherein however the blocking action can be eliminated by a shorter target code.

A particularly advantageous steering mechanism for scanning the guide track and for evaluating the target code resides in the features that it possesses a central scanner or feeler element which when traveling straight ahead is located over the guide track and after steering in onto the guide track serves for the return of the turning or steering deflection. To both sides of the central scanning element there are arranged at least two scanning elements with progressively increasing spacing and extending transversely with respect to the direction of travel, the outer scanning elements, when activated by the guide track, serve to trigger a greater turning or steering deflection than the inner scanning elements. According to a preferred constructional embodiment of the invention the ground conveyor installation is equipped with a supplementary code mechanism, the supplementary codes being constructed along the route network analogous to that of the switch code track, in other words, use is made of the already provided guide track. In this way the supplementary codes can be scanned or sampled by the same reading element which already scans the branch code track.

Ground conveyor installations which contain as an integral component thereof a lift or elevator are advantageously equipped with a target code mechanism which contains a branch code mechanism for the branch code and a story code mechanism for a story or floor code, wherein the latter serves for calling and programming a lift. Hence it has been found to be advantageous if there is arranged after the story code mechanism a transmitter for transmitting the story code and which can be activated along the stretch or path either through the agency of a supplementary code mechanism or via a command transmitter.

A particularly advantageous construction of ground conveyor installation can be realized if the branch code mechanism, the story code mechanism and the supplementary code mechanism in each case possess a storage which can be programmed via a common programming mechanism. For programming purposes there is furthermore advantageously arranged at the programming mechanism a programming receiver which receives the input data from a programmed transmitter. It is of particular advantage to use as the transmitter and receiver ultrasonic transmitters and receivers which operate with a number of carrier frequencies and in a binary system. The storages then can be flip-flop storages or flip-flops. In this way there is realized a maximum automation since even the switching-on and switching-off, the programming and so forth of a conveyor car at the transmitter- and receiving station is not dependent upon the presence of an operator.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
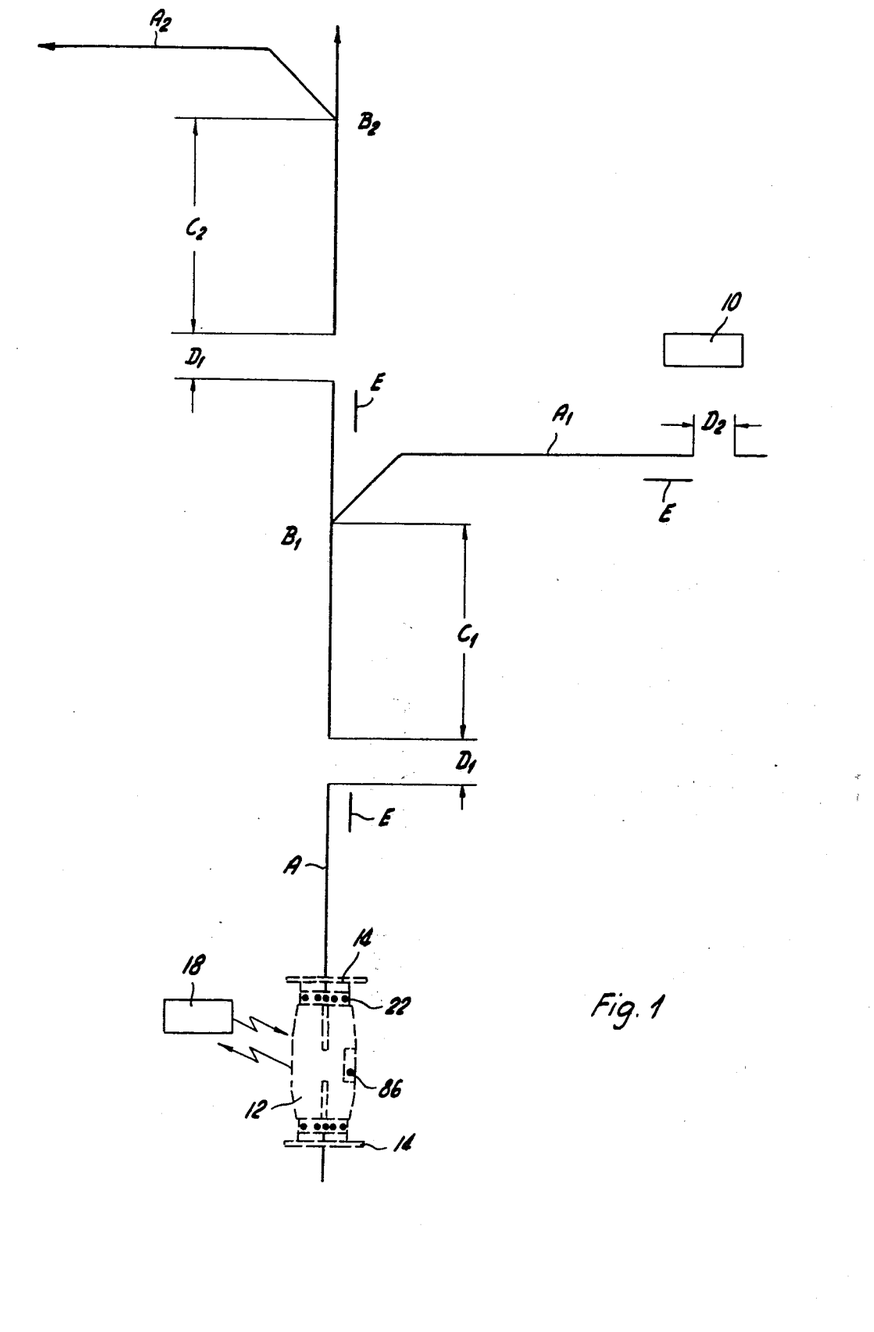
FIG. 1 schematically illustrates in plan view a section of the stretch or route network of the ground conveyor installation of this development.

Describing now the drawings, in FIG. 1 there is illustrated a section of a route or stretch network at which a guide track A branches off at the junctions or branches $B_1$ and $B_2$ into guide tracks $A_1$ and $A_2$ constituting sidings or branched-off locations. The guide tracks are passive, i.e. they do not deliver any pulses. They can be, for instance, colored strips, bands or tapes formed of ferromagnetic material, metallic bands or tapes or so forth. In front of the route branches or switches $B_1$ and $B_2$ there are arranged in each case the branch code tracks $C_1$ and $C_2$ constituting the branch codes, and which in the embodiment under discussion are themselves formed by the guide track. The length of the branch code tracks is determined by a supplementary code track $D_1$ located in front of the start of each of the branch code tracks $C_1$ and $C_2$, such supplementary code tracks $D_1$ not only marking or designating the start of the branch code tracks $C_1$ and $C_2$, but furthermore containing a supplementary code designated as branch or "switch". In front of such supplementary code track $D_1$, and parallel to the guide track A, there can be arranged an auxiliary track E which alerts the code reading or reader mechanism to the fact that a supplementary code track must be scanned. This auxiliary track can also additionally trigger auxiliary functions in the conveying or conveyor cars.

At the siding or branch of the stretch formed by the guide track $A_1$ there is likewise arranged a supplementary code track $D_2$ which activates a story code mechanism which will be described more fully hereinafter in order to cause a subsequently connected transmitter to transmit a story code which should be received by a receiver 10 arranged at the stretch. The receiver 10 serves to recall and, if necessary, code a lift or elevator.

Traveling over the guide track is a schematically illustrated conveyor car 12 having a forwardly arranged and rearwardly arranged rapid stop feeler 14 for stopping the conveyor car when it strikes a hinderance or obstruction. The rapid stop feelers or high-speed stop feelers 14 are, for instance, hydraulically or pneumatically acting contact switches which are preferably constructed as hose loops. Furthermore, the conveyor car is equipped with forward and rearward situated scanning or feeler heads 22 serving to guide the conveyor car along the guide track A and for diverting such at the branches $B_1$ and $B_2$.

Additionally, there is also illustrated a programming transmitter 18 which is arranged at the stretch or network, the construction and mode of operation of which will be discussed more fully hereinafter.

The conveyor car 12 which has been shown in FIG. 2 again has been illustrated to possess the high-speed operating stop feelers 14 at the front and rear end of such car. It also contains a steering or guide mechanism 20 embodying a feeler or scanner head 22, the steering drive or transmission 24, a steering motor 26 as well as a cam switching mechanism 28. Such steering mechanism is arranged at the front end of the conveyor car. Drive wheels 30 are actuated by the drive motors 32. The conveyor car also contains a work control mechanism 34.

Figure 2:
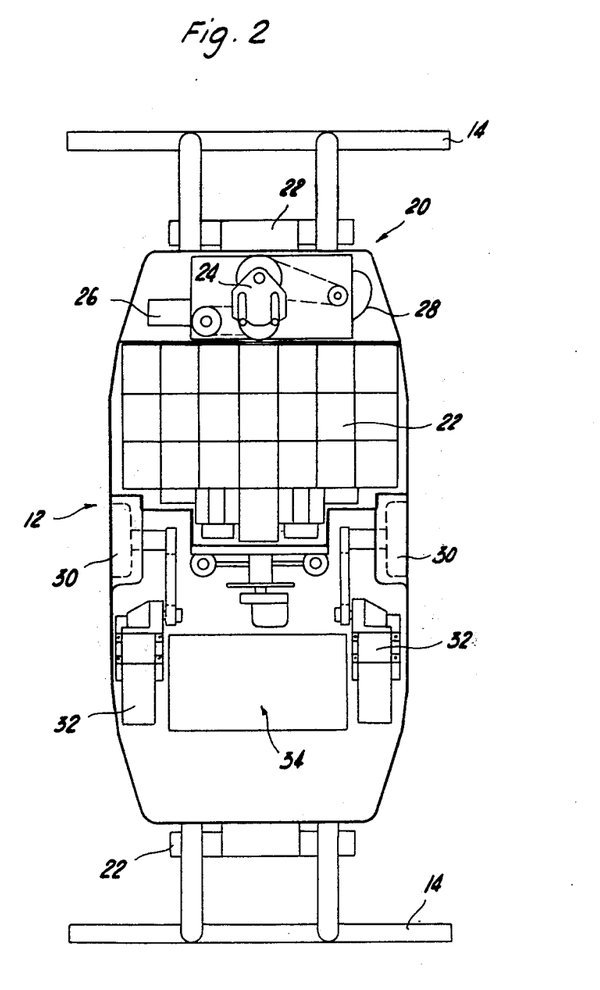
FIG. 2 illustrates in plan view one of the conveyor cars with exposed drive- and control components.
Figure 3:
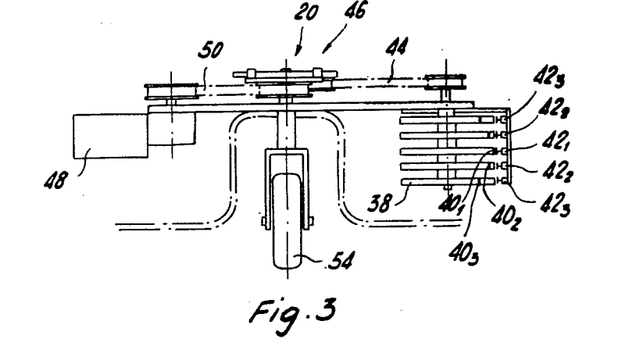
FIG. 3 illustrates in side view part of the steering mechanism.
Figure 4:
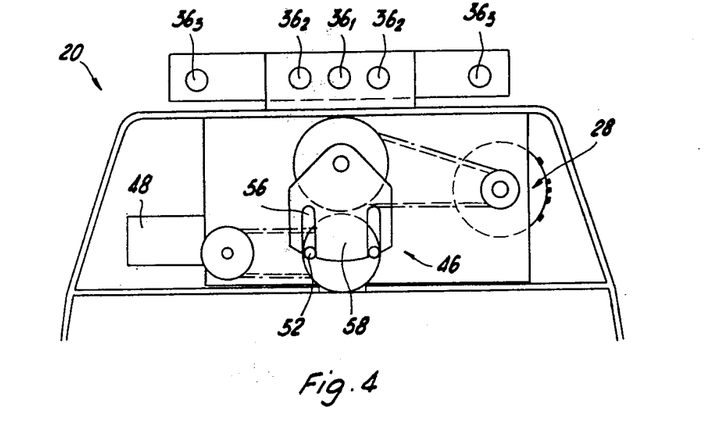
FIG. 4 is a plan view of the steering mechanism depicted in FIG. 3.

FIGS. 3 and 4 illustrate details of the steering mechanism 20 portrayed in FIG. 2, of which there is arranged a unit at the front end of the conveyor car. The rapid stop feeler 14 and the scanning head 22 are arranged both at the front as well as also at the rear end, wherein however in each instance only the components located at the front in the direction of travel are activated. The conveyor or conveying cars therefore can travel both forwards and backwards.

The rapid stop mechanism is constructed such that it again positively places into operation the conveying cars, if desired with a certain time-delay, but in any event as soon as the obstruction or hinderance is removed. The rapid stop mechanism therefore not only functions as an emergency device but also as the active control element of the ground conveyor installation.

The conveyor cars can travel without damage in an irregular sequence and can hit one another. The blocking stretches or paths required with the prior art ground conveyor installations are no longer necessary, since the rapid stopping mechanisms assume their function.

The steering mechanism 20 possesses the scanning or feeler head 22 which contains five scanning or feeler elements 36. A central scanning or feeler element $36_1$, which is located over the guide track A when traveling straight ahead, serves the purpose, after turning or deflecting the conveyor car onto the guide track, of bringing about resetting of the turning or steering deflection. Transversely with respect to the conveying direction and to both sides of the central scanning element $36_1$ there are located at a slight spacing therefrom the first scanning elements $36_2$. Activation of the first scanning elements $36_2$ bring about only a small steering deflection or turning effect and serves to correct the conveyor car during slight deviations from the guide track. At progressively larger spacing there are arranged towards the outside at both sides of the first scanning elements $36_2$ the second scanning elements $36_3$ which, during greater deviations of the conveyor car, especially when traveling in curves and at branches, come into play and bring about a greater steering deflection. The scanning elements 36 are operatively connected with the cam switching mechanism 28, wherein each scanning element has associated therewith a cam disk 38, the switching cams 40 of which cooperate with switching elements 42. The cam switching mechanism 28 is coupled through the intermediary of a toothed belt 44 with a steering drive 46 which is driven from a steering motor 48 likewise through the agency of a toothed belt 50. The steering drive or transmission contains a crank guide drive, the crank pin 52 of which, during the time that the steering roller 54 travels straight ahead, is located at the center of a loop 56. In order to permit a better null point correction in this instance the loop 56 is sub-divided into two halves, wherein in the one half of such loop the crank pin 52 engages during the movement towards the left and in the other half thereof there engages a crank pin during the movement towards the right. The arm 58 carrying the loop is connected with the steering roller 54.

During the straight ahead movement of the conveyor car the switching cams $40_2$ and $40_3$ of the outer scanning elements $36_2$ and $36_3$ do not cooperate with the switching elements $42_2$ and $42_3$, so that their contacts bear against the cam disks. Now if one of the outer scanning elements $36_2$ or $36_3$ is activated by the guide track A, then via the switching elements $42_2$ or $42_3$ and the corresponding cam disk 38 there is closed a current circuit which energizes the steering motor 48, so that a deflection or turning of the steering roller 54 occurs. The deflection continues for such time until the switching cams 40 of the corresponding scanning element 36 travel onto the associated switching element 42 and interrupt the current circuit, so that no further deflection or turning occurs. The conveyor car then travels back onto the guide track until the central scanning element $36_1$ is energized by the guide track. Since the switching cam $40_1$, during a turning deflection, is not in engagement with the switch $42_1$ it closes via the associated cam disk 38 a resetting current circuit which causes the steering motor 48 to rotate in the opposite direction, i.e. again sets straight the steering roller 54. The resetting of the roller occurs for such length of time until the switching cam $40_1$ bears against the switching element $42_1$ and interrupts the resetting current circuit.

Figure 5:
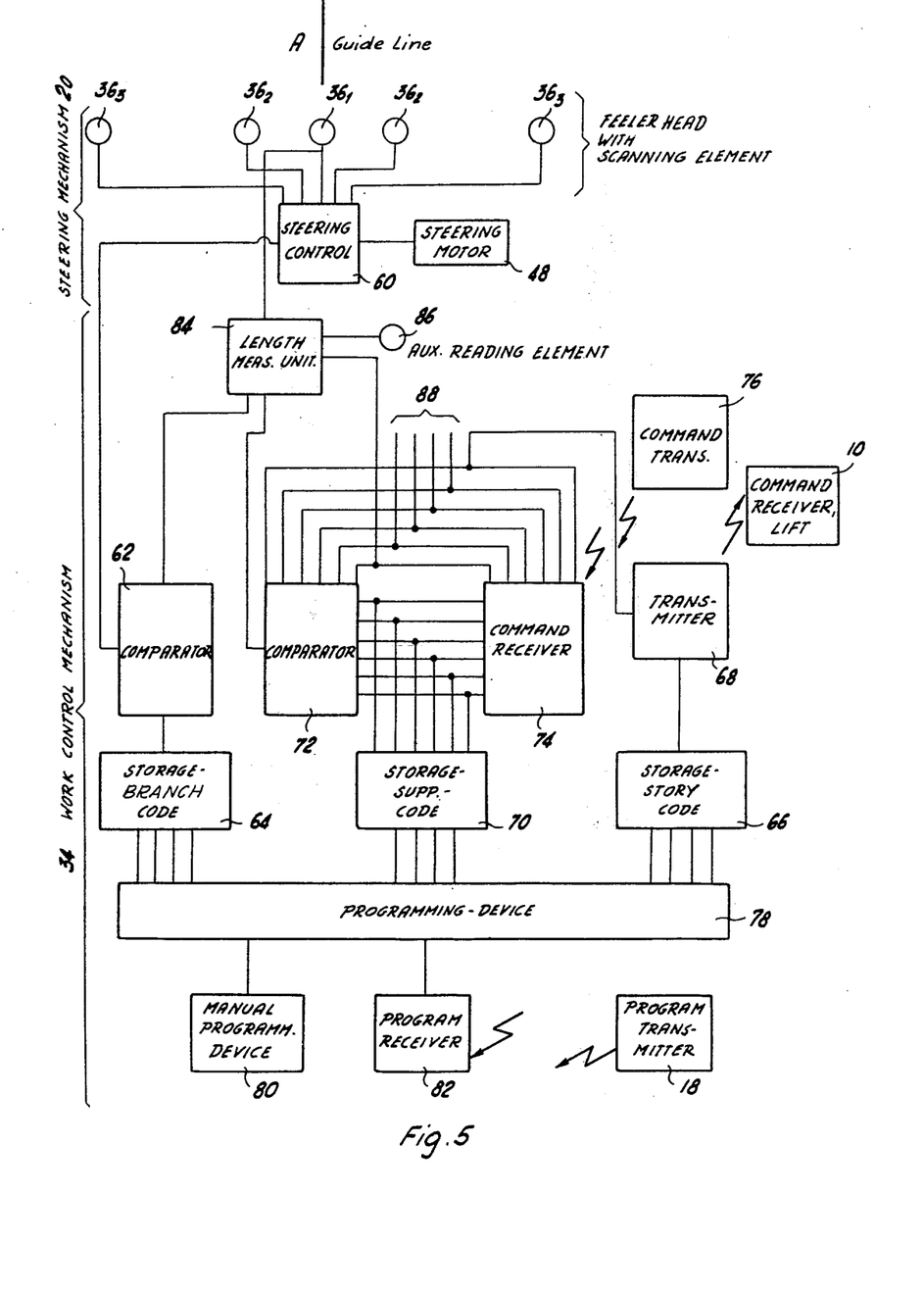
FIG. 5 is a block circuit diagram of the steering mechanism and the function or work control mechanism.

In FIG. 5 there is illustrated the block circuit diagram of a conveyor car for the work control mechanism 34 and the steering mechanism 20. The mode of operation of the steering mechanism 20 has been described in detail heretofore, so that at this point there is only additionally mentioned that the steering control 60 contains the cam switching mechanism 28. The work control mechanism contains two or three main groups, the target or destination code mechanism which is sub-divided into the branch code mechanism with the comparator 62 and the storage 64 and the story code mechanism with the storage 66 and the transmitter 68, and the supplementary code mechanism containing the storage 70, the comparator 72 and the command receiver 74 which is activated by a command transmitter 76 at the stretch or network. Common to all of the mechanisms is a programming device or mechanism 78 which can be programmed either by a manual programming device 80 or by a programming receiver 82 which receives its signals from a programming transmitter 18. As the reading mechanism or reader of the work control mechanism there is used the central scanning element $36_1$ of the steering mechanism, which is connected with a length measuring unit or device 84. Connected thereafter are the comparators 62 and 72 of the branch code mechanism and the supplementary code mechanism, respectively. The length measuring unit 84 is, for instance, constituted by a counting wheel which parallely travels with a drive wheel of the conveyor car and for each unit length delivers a certain number of pulses, as will be explained more fully hereinafter in conjunction with FIG. 10. The work control mechanism furthermore contains an auxiliary reading element 86 which responds to the auxiliary track E and is connected with the length measuring unit.

Further details of the construction and the mode of operation of the work control mechanism are as follows: It is possible to program the programming mechanism either by means of the manual programming mechanism or device 80 or preferably by means of the programming receiver 82 which is supplied by means of the programming transmitter 18, and which are preferably ultrasonic receivers and transmitters. They can operate for instance with four carrier frequencies and transmit binary coded signals. The programming device is for instance coupled by means of four respective lines or conductors with the storage 64, 70 and 66 of the branch code-, supplementary code- and story code-mechanisms. These storages are preferably constructed as flip-flop storages. With the four infeed lines it is possible to transmit up to sixteen commands. At a station, via the programming transmitter 18, ultrasonic signals are introduced in binary coded form to the programming receiver 82 and specifically, for instance, a target or destination code having three numbers between one and ten. After termination of such transmission the target code is transmitted to all three flip-flop storages. A fourth switching element subsequently renders the flip-flop storages 64 and 66 non-responsive to any further reception, whereas the flip-flop storage 70 of the supplementary code mechanism is capable of receiving further supplementary codes during the travel of the car and to transform such into appropriate commands.

If a thus programmed conveyor car travels along the stretch of FIG. 1, then the steering mechanism 20 scans with the aid of its scanning or feeler element $36_1$ the guide track. If the auxiliary reading element 86 reaches the auxiliary track E, then, it delivers to the length measuring unit 84 a command that it must count upon arrival at the supplementary code track $D_1$. If the central scanning element $36_1$ reaches the supplementary code track $D_1$, which is formed by omitting the guide track along a certain path, then the central scanning element $36_1$ transmits a signal to the length measuring unit at which there is measured the length of the supplementary code track $D_1$. The output of the length measuring unit is coupled with the comparator 72 of the supplementary code mechanism 70. The measured length of the supplementary code track $D_1$ must now coincide with the code stored in the supplementary code mechanism for the command branch or "switch". Then the comparator generates an output signal which is further transmitted to the length measuring unit 84 and switches such to the comparator 62. During further travel of the conveyor car there now occurs a length measurement of the branch code $C_1$. At the moment when the comparator 62 is connected with the length measuring unit 84, it delivers a signal to the length control which brings about that the outer scanning elements $36_3$ are switched-off, i.e. they cannot recognize any branching or siding. The comparator 62 now continuously compares the length of the branch code track $C_1$ with the branch code which has been introduced into the storage 64. If the branch code is shorter than the branch code track $C_1$ then the comparator again delivers an output signal which at the steering control 60 brings about an activation of the outer scanning elements $36_3$. During further travel of the conveyor car these outer scanning elements $36_3$ can recognize or detect the siding $A_1$ and the conveyor car turns off. On the other hand, if the branch code contained in the storage 64 is longer than the branch code track $C_1$, then during the scanning of the branch code track $C_1$ there does not occur any activation of the outer scanning elements $36_3$, rather first at the end of the branch code track $C_1$. In this position, however, the scanning head of the conveyor car is already past the siding $A_1$ so that the conveyor car continues to travel straight ahead and does not turn off. In this way there can be achieved the result that, for instance, with ten different length branch code tracks C there can be detected ten different junction or branches. It shouuld be apparent that there are not required any further active control elements along the stretch or network.

If the conveyor car travels along the branch or siding with the guide track $A_1$, then it arrives at the supplementary code track $D_2$ which signifies "Call Lift". The signal delivered by the central scanning element $36_1$ at the length measuring unit 84 again arrives at the comparator 72 which compares the measured length with the supplementary codes of the storage 70. Consequently, it determines that the supplementary code track $D_2$ intends to call the lift and transmits via its output connected with the transmitter 68 a signal for activating the transmitter. Such transmits the story code contained in the storage 66 to the reciever 10 arranged at the network, whereupon such calls and programs a lift or elevator. The lift basket can only possess a single guide track for the ascending as well as also for the descending direction of travel.

The supplementary code mechanism not only contains a comparator 72 connected with the length measuring unit 84, rather also a command receiver 74 which responds to a command transmitter 76 along the conveying path. By means of this command transmitter, which likewise can function with ultrasonic energy, it is possible to transmit different commands of the supplementary code mechanism. The comparator 72 and the command receiver 74 further possess different common outputs 88 which can be conected with different devices of the conveyor car in order to trigger appropriate functions. Thus, the supplementary code mechanism can serve the purpose of generating further travel signals, such as, start of the travel, turning, half-speed travel, opening or closing of the scanning elements, full speed travel, engaging or disengaging the coupling and the like.

In FIGS. 6 to 9 there are illustrated different variant constructions of the branch code track and the supplementary code track.

Figure 6:
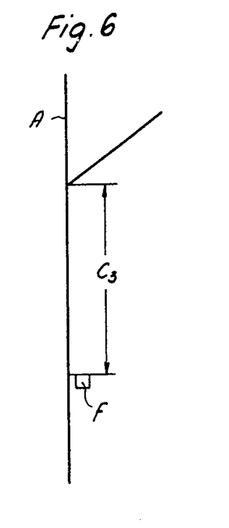
FIG. 6 illustrates a route branch or switch with a continuous switch code track and a marker.

In FIG. 6 the branch code track $C_3$ again is constituted by a continuous i.e. non-interrupted line of the guide track A, the start of the branch code track $C_3$ being determined by a marker F. With this embodiment there is not present any supplementary code track in front of the start of the branch code track $C_3$.

Figure 7:
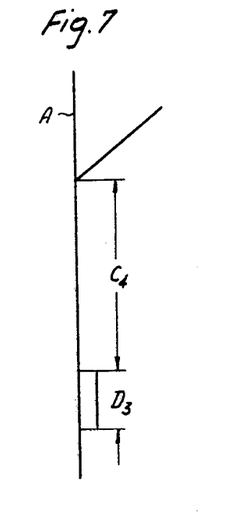
FIG. 7 illustrates a branch or junction likewise with a continuous or uninterrupted branch code track and aa forwardly located supplementary code track which extends parallel to the guide track.

FIG. 7 likewise illustrates a continuous branch code track $C_4$ which is formed by the guide line A, and the start of which is determined by a supplementary code track $D_3$. This supplementary code track is located parallel to the guide track A.

Figure 8:
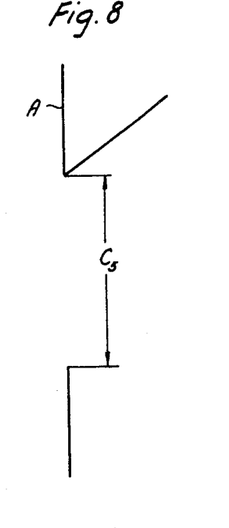
FIG. 8 illustrates a branch with a branch code track formed by an interruption of the guide track.

FIG. 8 illustrates a branch code track $C_5$ which is formed by an interruption of the guide line or track A along the length of the branch code track.

Figure 9:
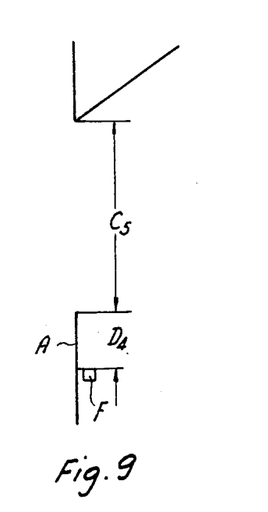
FIG. 9 illustrates a branch according to the showing of FIG. 8, however with a continuous or uninterrupted supplementary code track.

FIG. 9 corresponds to FIG. 8, however in this case there is located at the start of the branch code track $C_5$ a supplementary code track $D_4$ which is formed by a continuous line of the guide track A and the start of which is determined by a marker F.

Figure 10:
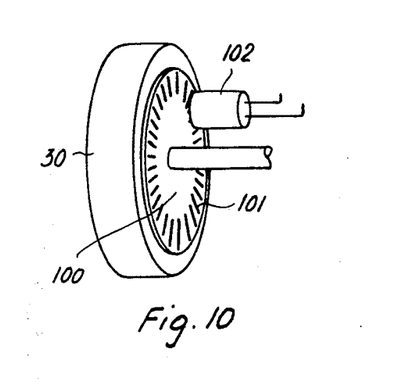
FIG. 10 illustrates details of a length measuring device.

FIG. 10 illustrates a possible arrangement of the length measuring device or unit wherein a disk 100 is located for example at the drive wheel 30 of the car 12. The disk 100 is provided along a circle with markings 101 having uniform spacing from one another. This spacing can correspond for instance to a length unit of the traveled path. These markings 101, which for instance can consist of metal strips, can be scanned by a scanning device 102 fixedly arranged at a frame of the car and which scanning device 102 then obviously would be part of the length measuring unit 84 of the block circuit diagram of FIG. 5. During rotation of the disk 100 the markings 101 move past the scanning device 102 as a function of the path through which the car has traveled. The scanning device 102 then can deliver a number of pulses corresponding to the rotation of the disk 100 and thus the length of travel of the car.

While there is shown and described present preferred embodiments of the invention, it is to be distinctly understood that the invention is not limited thereto but may be otherwise variously embodied and practiced within the scope of the following claims. Accordingly,

What is claimed is:

1. An automatic railless ground conveyor installation comprising a guide track for defining a route network having branches, a number of individual driverless traveling conveyor cars, each of said conveyor cars possessing steering mechanism and scanning elements for the contactless scanning of the guide track and a work control mechanism, said work control mechanism including code reading means for the contactless scanning of individual code markings identifying the branches and arranged at the branches and directly influencing the steering mechanism in the sense of reaching a destination determined by a target code set at the work control mechanism, the improvement comprising: that in front of each branch a partial section of the guide track defined by fixed points serves as a branch code track, the length of which constitutes the code of the branch, said work control mechanism being provided with a target code mechanism for introducing a target code in the form of a length, a length measuring device for measuring the length of the branch code track, and a comparator for comparing the target code introduced as a length by the target code mechanism with the measured length of the branch code track, the comparator being operatively coupled with the steering mechanism.

2. The ground conveyor installation as defined in claim 1, wherein the scanning elements comprise a central scanning element which during straight ahead travel of the conveyor car is located over the guide track and after turning of the conveyor car onto the guide track serves to reset the steering deflection of the conveyor car, and at least two scanning elements arranged to both sides of the central scanning element at a progressively increasing distance therefrom and transversely arranged with respect to the direction of travel, the outermost scanning elements when activated by the guide track serve to trigger a greater steering deflection than the inner situated scanning elements.

3. The ground conveyor installation as defined in claim 2, wherein the steering mechanism comprises a steering drive including a steering motor, a cam switching mechanism operatively coupled with a steering drive and movable in proportion to the steering movement, each scanning element having operatively associated therwith a cam disk cooperating with switching elements, the scanning elements have switching cam means, and wherein the switching cam means of the central scanning element during its activation activate a resetting current circuit for the steering motor and the switching cam means of the remaining scanning elements are arranged such that for limiting the steering deflection they interrupt a drive current circuit of the steering motor.

4. The ground conveyor installation as defined in claim 3, wherein the steering drive is provided with crank guide drive means including crank pin means, loop means cooperating with said crank pin means, said crank pin means being located at the center of said loop means when the conveyor car travels substantially straight ahead.

5. The ground conveyor installation as defined in claim 4, wherein the target code mechanism is coupled with the steering mechanism such that a steering movement of the steering mechanism in the sense of turning-off at the branch is blocked for the length of the branch code track, and the blocking action can be eliminated by a shorter target code.

6. The ground conveyor installation as defined in claim 5, wherein the target code mechanism is operatively coupled with the outer scanning elements triggering the steering deflection in such a way that it can be disconnected by an output signal of the comparator for the duration of blocking of the steering mechanism.

7. The ground conveyor installation as defined in claim 6, wherein at least the start of the branch code track forming a part of the guide track is determined by a marker defining one of said fixed points.

8. The ground conveyor installation as defined in claim 7, further including at least one supplementary code for transmitting supplementary information arranged along the route network and capable of being scanned without contact by a reader mechanism of the work control mechanism, each supplementary code comprising a continuous supplementary code track, the length of which serves as a code for supplementary information, said length measuring device measuring the length of the supplementary code track, said work control mechanism being provided with a supplementary code mechanism and a further comparator for comparing the measured supplementary code track length with supplementary codes which are introduced as lengths by said supplementary code mechanism, said further comparator delivering a signal upon coincidence of the supplementary code track with a supplementary code.

9. The ground conveyor installation as defined in claim 8, wherein said supplementary code track constitutes part of the guide track, and at least the start thereof is determined by a marker.

10. The ground conveyor installation as defined in claim 8, wherein the supplementary code track is constituted by an interruption of the guide track corresponding to the length of the supplementary code.

11. The ground conveyor installation as defined in claim 8, wherein the supplementary code track is arranged essentially parallel to the guide track.

12. The ground conveyor installation as defined in claim 8, wherein a supplementary code track with a code designation "branch" is arranged in front of each branch code track.

13. The ground conveyor installation as defined in claim 12, wherein one of said scanning elements of the steering mechanism for the guide track simultaneously serves as the reading element of the work control mechanism.

14. The ground conveyor installation as defined in claim 12, wherein the target code mechanism and the supplementary code mechanism possess a common length measuring device which in its basic position is coupled with the supplementary code mechanism and can be switched by means of the supplementary code signal "branch" to the target code mechanism.

15. The ground conveyor installation as defined in claim 14, wherein the length measuring device comprises a counting wheel running parallel with a drive wheel of the conveyor car and delivering for each unit length a predetermined number of pulses.

* * * * *